Nov. 22, 1966  N. R. ARTHUR  3,287,019
MANEUVERABLE TARGET FOR ANTI-MISSILE SYSTEMS
Filed April 20, 1964

INVENTOR.
N. ROBERT ARTHUR

ATTORNEYS

3,287,019
MANEUVERABLE TARGET FOR ANTI-MISSILE SYSTEMS

Norman Robert Arthur, Silver Spring, Md., assignor to the United States of America as represented by the Secretary of the Air Force
Filed Apr. 20, 1964, Ser. No. 361,631
6 Claims. (Cl. 273—105.4)

This invention relates, in general, to missile rocketry, and in particular, to a maneuverable target for an anti-missile system.

Effective anti-missile defense systems, for example, Nike-Zeus, must be capable of striking a maneuvering target. Perfection of this capability requires the use of maneuvering target vehicles.

Therefore, it is an object of this invention to provide a maneuvering target vehicle for anti-missile defense systems.

It is an object of this invention to utilize the frictional energy of a re-entry vehicle to cause it to change direction.

It is still another object of the invention to provide a maneuvering target vehicle which is simple in operation, and which is economical to produce by utilizing conventional, currently available components and materials that lend themselves to standard mass production manufacturing techniques.

Figure 1:
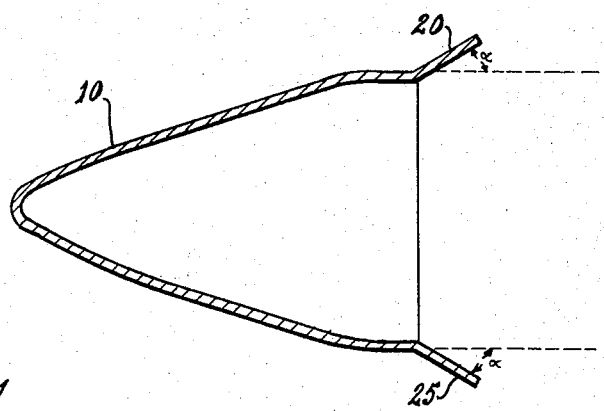
Figure 2:
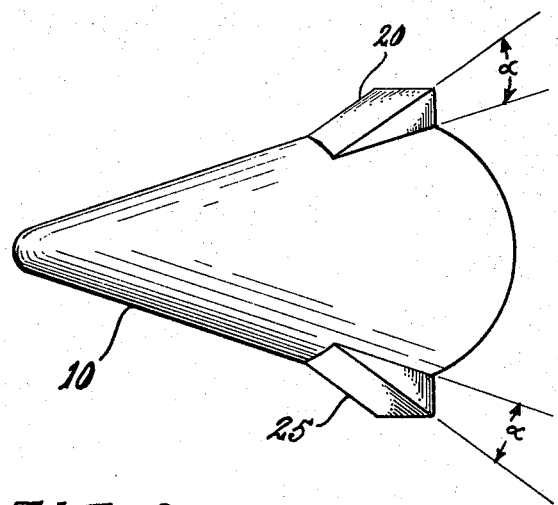

Other objects and a fuller understanding of the invention may be had by referring to the following description and claims, taken in conjunction with the accompanying drawings, in which:

FIGURE 1 is a schematic cross-section of a re-entry vehicle having control flaps of the invention; and FIGURE 2 is a perspective view of a re-entry cone having wedge shaped control flaps.

With reference to the figures, wherein like numerals refer to like parts, a target vehicle 10 is provided by a re-entry nose cone known in missile rocketry. As illustrated, a pair of flaps 20, 25 are affixed at symmetrical, balanced aerodynamic opposed positions spaced apart by 180 degrees on the base of cone 10. Each flap extends outward from the cone 10 at an angle $\alpha$ which is determined by the extent of the maneuver to be performed. The flaps 20, 25 are of different materials which, under the frictional energy of re-entry, will ablate at different rates. FIGURE 2 shows a re-entry cone 10 having wedge shaped flaps 20 and 25.

Friction between a rocket and ambient atmosphere during ascent is very slight because the rocket does not attain full speed until well into the thin upper atmosphere. However, upon re-entry into the lower thicker atmosphere at high speed a considerable amount of friction is developed, and is an important problem in rocketry. Flaps 20, 25 are aerodynamically balanced for ascent and flight, and are fabricated of materials having different ablation rates due to friction. The difference in ablation rates may be suitably chosen so that one flap may be entirely or partially ablated. The ablation at different rates creates unequal aerodynamic forces which tend to turn the cone 10 in a new direction. A more gradual turn may be effected by using wedge shaped flaps 20, 25, wherein differential ablation will form control surfaces at different angles. Existing rocket technology has tabulated rates of ablation for various materials which may be chosen as desired. The cone 10, because of the unbalanced flaps 20, 25, will fly in a spiral path; however, if desired, the cone 10 may be spin stabilized by known methods to fly in a somewhat circular path.

Although the invention has been described with reference to a particular embodiment, it will be understood to those skilled in the art that the invention is capable of a variety of alternative embodiments within the spirit and scope of the appended claims.

I claim:

1. A maneuverable target for anti-missile systems, comprising: a re-entry target vehicle; a plurality of flaps affixed on said vehicle at balanced aerodynamic positions, one of said flaps of a rapid ablation material causing, during re-entry, an aerodynamic unbalance to maneuver said target vehicle.

2. A maneuverable target for anti-missile systems, comprising: a re-entry target cone; a plurality of flaps affixed on said cone at symmetrical, balanced aerodynamic positions, one of said flaps of a material having a more rapid ablation due to re-entry friction providing an aerodynamic unbalance thereat to maneuver said target cone.

3. A maneuverable target for anti-missile systems, comprising: a re-entry target cone; a plurality of flaps affixed in symmetrical, balanced aerodynamic positions at the base of said cone, one of said flaps of a material having a more rapid ablation due to re-entry friction providing an aerodynamic unbalance thereat to maneuver said target cone.

4. A maneuverable target for anti-missile systems, comprising: a re-entry target cone; a pair of flaps affixed at symmetrical, balanced aerodynamic opposed positions spaced apart 180 degrees on the base of said cone, one of said flaps of a material having a more rapid ablation due to re-entry friction providing an aerodynamic unbalance thereat to maneuver said target cone.

5. A maneuverable target for anti-missile systems, comprising: a re-entry target cone; a pair of flaps affixed at symmetrical, balanced aerodynamic opposed positions spaced apart 180 degrees on the base of said cone, and extending therefrom at an angle according to desired maneuverability, one of said flaps of a material having a more rapid ablation than the other due to re-entry friction providing an aerodynamic unbalance thereat to maneuver said target cone.

6. The combination according to claim 5 wherein said flaps are wedge shaped materials of different ablation rates.

References Cited by the Examiner
UNITED STATES PATENTS 3,119,576   1/1964   Nielsen _____ 244—1

DELBERT B. LOWE, *Primary Examiner.*

M. R. PAGE, *Assistant Examiner.*